US008761757B2

(12) United States Patent
Costelloe

(10) Patent No.: US 8,761,757 B2
(45) Date of Patent: Jun. 24, 2014

(54) IDENTIFICATION OF COMMUNICATION DEVICES IN TELECOMMUNICATION NETWORKS

(75) Inventor: Colm Costelloe, Dublin (IE)

(73) Assignee: Tektronix, Inc., Beaverton, OR (US)

( * ) Notice: Subject to any disclaimer, the term of this patent is extended or adjusted under 35 U.S.C. 154(b) by 57 days.

(21) Appl. No.: 13/619,503

(22) Filed: Sep. 14, 2012

(65) Prior Publication Data

US 2014/0080478 A1    Mar. 20, 2014

(51) Int. Cl.
*H04W 24/00*    (2009.01)
(52) U.S. Cl.
USPC ............ 455/423; 455/418; 455/450; 370/338
(58) Field of Classification Search
USPC ................. 455/412.1, 418, 423, 450; 370/338
See application file for complete search history.

(56) References Cited

U.S. PATENT DOCUMENTS

| 2004/0052233 | A1* | 3/2004 | Skog et al. ..................... | 370/338 |
| 2006/0101417 | A1* | 5/2006 | Hoh .............................. | 717/130 |
| 2008/0305775 | A1* | 12/2008 | Aaltonen et al. ........... | 455/412.1 |
| 2010/0088367 | A1* | 4/2010 | Brown et al. .................. | 709/203 |
| 2010/0257158 | A1* | 10/2010 | Sugaya .......................... | 707/723 |
| 2011/0320615 | A1* | 12/2011 | Skog et al. ..................... | 709/227 |
| 2012/0003983 | A1* | 1/2012 | Sherlock et al. .............. | 455/450 |
| 2012/0184258 | A1* | 7/2012 | Kovvali et al. ................. | 455/418 |

* cited by examiner

*Primary Examiner* — Nathan Taylor
(74) *Attorney, Agent, or Firm* — Edwards Wildman Palmer LLP; Scott D. Wofsy; George N. Chaclas

(57) ABSTRACT

Systems and methods for identifying communication devices in telecommunication networks are described. In some embodiments, a method may include receiving an identification code of a device operating in a network controlled, at least in part, by a telecommunications operator, the device having a model and/or a manufacturer. The method may also include obtaining user-plane information within one or more communications made by the device, correlating the identification code with the user-plane information, and determining, based upon the correlation the model and/or the manufacturer of the device. In some cases, by correlating these disparate pieces of information, an approximation of the device's identifier may be created, which may then allow the device to be identified (e.g., for presentation, etc.) even in cases where such an identifier has not been provisioned (or even has been provisioned incorrectly) to a telecommunications monitoring system by the network operator.

15 Claims, 6 Drawing Sheets

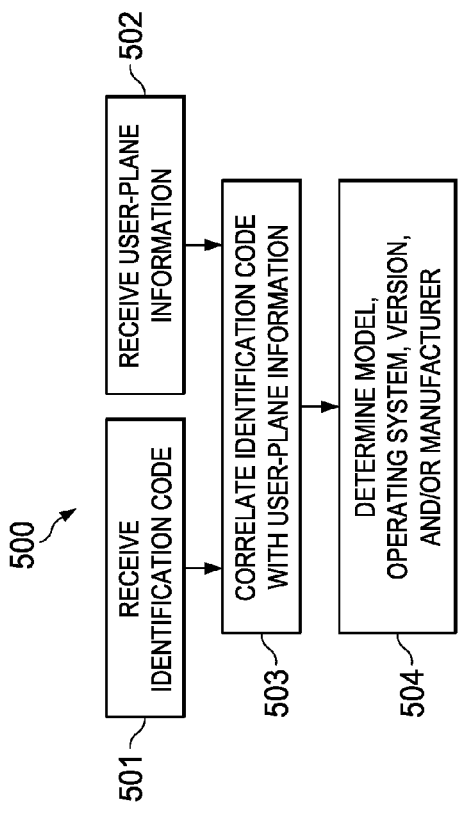

IDENTIFICATION OF COMMUNICATION DEVICES IN TELECOMMUNICATION NETWORKS

BACKGROUND

The following discussion sets forth the inventor's own knowledge of certain technologies and/or problems associated therewith. Accordingly, this discussion is not an admission of prior art, and it is not an admission of the knowledge available to a person of ordinary skill in the art.

Mobile data networks continue to experience an unprecedented explosion in total traffic, particularly as new types of client devices (e.g., web-enabled smart phones, tablet devices, Internet-enabled TVs, gaming consoles, etc.) begin to consume larger amounts of bandwidth. Nowadays, data speeds of network traffic can be as high as 100 Gigabit/second (Gb/s). Thus, to remain competitive, network operators may employ network monitoring solutions configured to monitor services, performance, customer experience, equipment issues, etc. These network monitoring solutions typically have two components. First, one or more entities known as "probes" receive network data and perform analysis and/or correlation of that entire data. Second, a server (or a cluster of servers) further aggregates the processed data and presents it to end-users.

As the inventor hereof has recognized, a desirable feature of network monitoring applications would include the ability to present and filter information by communication device (e.g., handset, etc.). Unfortunately, however, a network operator is typically not in control of the availability of devices on its own network (e.g., subscribers may purchase them without the operator's knowledge, subscribers may port their phone numbers and retain the same handset, roaming users may use the network, etc.), and therefore may not be able to provide information about all of those devices to its monitoring system. Also, the operator's provisioning of device information to the network monitoring system, even where such information available to the operator, typically lags the introduction of new devices by several days or weeks. This often means that, during the introduction phase of a new device, certain critical information is either missing (e.g., discarded) or aggregated into a catch all, "unknown" category.

Currently, there is no globally available database of device or handset versions, so even where a communication device has been provisioned correctly, the same information represents all instances of that device regardless of software version. In the current era of sophisticated software-based devices and rapidly iterating software versions, this makes it impossible to determine the impact of a device's software version on the service experience. Accordingly, to address these and other issues, the inventor hereof has developed various systems and method for identifying communication devices in telecommunication networks.

SUMMARY

Embodiments of systems and methods for identifying communication devices in telecommunication networks are described herein. In an illustrative, non-limiting embodiment, a method may include receiving an identification code of a device operating in a network controlled at least in part by a telecommunications operator, the device having at least one of: a model or a manufacturer; obtaining user-plane information within one or more communications made by the device; correlating the identification code with the user-plane information; and determining, based upon the correlation, at least one of: the model or the manufacturer of the device. In some cases, prior to the determination, at least one of the model or the manufacturer may not have been provided to the telecommunications monitoring system by the telecommunications operator, or may have been incorrectly provided to the telecommunications monitoring system by the telecommunications operator.

In some implementations, the identification code may be an International Mobile Equipment Identity-Type Allocation Code (IMEI-TAC) or a Mobile Equipment Identifier-Manufacturer Code (MEID-MC). Also, the user-plane information may include a User Agent (UA) Profile Resource Description Framework (RDF) value, the UA Profile RDF may include at least one of the model or the manufacturer of the device, the UA Profile RDF may include a Uniform Resource Identifier (URI), and/or at least one of the model or the manufacturer may be determined based upon the URI. Additionally or alternatively, the user-plane information may include a User Agent (UA) value of a web browser executed by the device and at least one of the model or the manufacturer may determined based upon the User Agent (UA) value of the web browser.

In some embodiments, the user-plane information may include a User Agent (UA) Profile Resource Description Framework (RDF) information, and method may further comprise storing data associated with the device, the data including an indication of: (i) the model and the manufacturer, in response to the UA Profile RDF information including the model and manufacturer of the device; (ii) the manufacturer and a generic identification of the model, in response to the UA Profile RDF information including a domain name but not the model; or (iii) at least one of the model or the manufacturer obtained from the UA value of a web browser executed by the device, in response to the UA Profile RDF information not including: the domain name, the model, and the manufacturer. Moreover, the method may also include determining, based upon the correlation, a Software Version (SVN) of the device.

In another illustrative, non-limiting embodiment a method may include receiving an identification code of a device operating in a network, the identification code obtained over a first network interface, the network controlled at least in part by a telecommunications operator; receiving user-plane information within a communication originated by the device over a second network interface, the second network interface different form the first network interface; and determining, based upon a correlation between the identification code and the user-plane information, at least one of: the model or the manufacturer of the device. For example, the first interface may be an A interface, an IuCS interface, a Gb interface, an IuPS interface, or a MAP-D interface, and/or the second interface may be a Gn interface, a Gi interface, or a Proxy interface.

In yet another illustrative, non-limiting embodiment, a method may include receiving an identification code of a device operating in a network, the identification code obtained over a first network interface, the network controlled at least in part by a telecommunications operator, wherein at least one of the model or the manufacturer: (i) has not been provided to the telecommunications monitoring system by the telecommunications operator, or (ii) has been incorrectly provided to the telecommunications monitoring system by the telecommunications operator; receiving user-plane information within a communication originated by the device over a second network interface; and determining, based upon a relationship between the identification code and the user-plane information, at least one of: the model or the manufacturer of the device.

In some embodiments, one or more of the methods described herein may be performed by one or more network monitoring systems. In other embodiments, a tangible computer-readable storage medium may have program instructions stored thereon that, upon execution by one or more network monitoring systems, cause the one or more network monitoring systems to perform one or more operations disclosed herein. In yet other embodiments, a system may include at least one processor and a memory coupled to the at least one processor, the memory configured to store program instructions executable by the at least one processor to cause one or more network monitoring systems to perform one or more operations disclosed herein.

BRIEF DESCRIPTION OF THE DRAWINGS

Reference will now be made to the accompanying drawings, where:

FIG. 5 is a flowchart of a method of identifying communication devices in telecommunication networks according to some embodiments.

FIG. 6 is a block diagram of a hierarchical device information data structure according to some embodiments.

While this specification provides several embodiments and illustrative drawings, a person of ordinary skill in the art will recognize that the present specification is not limited only to the embodiments or drawings described. It should be understood that the drawings and detailed description are not intended to limit the specification to the particular form disclosed, but, on the contrary, the intention is to cover all modifications, equivalents and alternatives falling within the spirit and scope of the claims. Also, any headings used herein are for organizational purposes only and are not intended to limit the scope of the description. As used herein, the word "may" is meant to convey a permissive sense (i.e., meaning "having the potential to"), rather than a mandatory sense (i.e., meaning "must"). Similarly, the words "include," "including," and "includes" mean "including, but not limited to."

DETAILED DESCRIPTION

Figure 1:
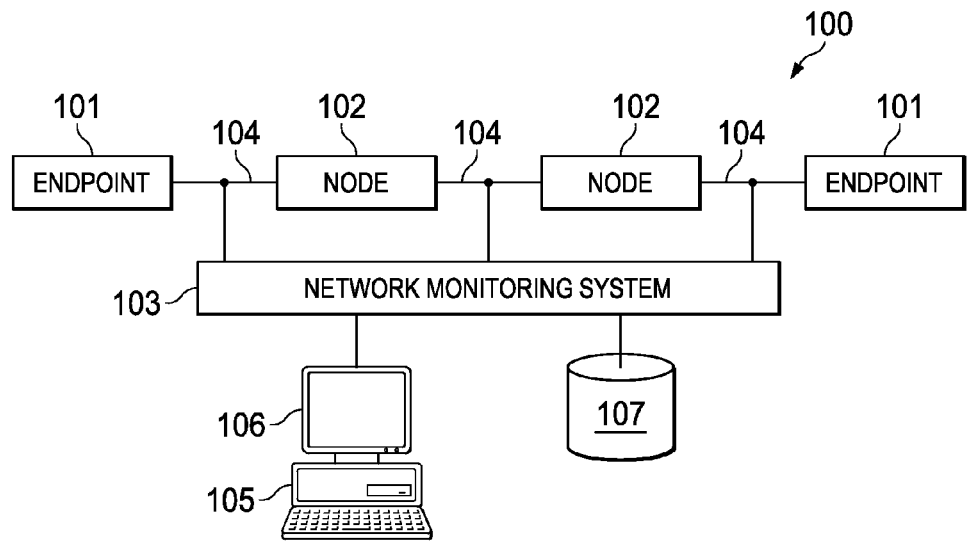
FIG. 1 is a block diagram of a network monitoring environment according to some embodiments.

FIG. 1 illustrates a block diagram of a network monitoring environment according to some embodiments. Particularly, telecommunications network 100 includes network nodes 102 and endpoints 101. For example, network 100 may include a wireless broadband network, a 3G network, a 4G network, a 3GPP Long Term Evolution (LTE) network, a voice-over-IP (VoIP) network, an IP Multimedia Subsystem (IMS) network, etc. Although only two nodes 102 and two endpoints 102 are shown in FIG. 1, it will be understood that network 100 may comprise any number of nodes 102 and endpoints 101. Moreover, it will be understood that the nodes 102 and endpoints 101 in network 100 may be interconnected in any suitable manner, including being coupled to one or more other nodes 102 and/or endpoints 101.

In some implementations, endpoints 101 may represent, for example, computers, mobile devices, user equipment (UE), client applications, server applications, or the like. Meanwhile, nodes 102 may be components in an intranet, Internet, or public data network, such as a router or gateway. Nodes 102 may also be components in a 3G or 4G wireless network, such as a Serving GPRS Support Node (SGSN), Gateway GPRS Support Node (GGSN) or Border Gateway in a General Packet Radio Service (GPRS) network, Packet Data Serving Node (PDSN) in a CDMA2000 network, a Mobile Management Entity (MME) in a Long Term Evolution/Service Architecture Evolution (LTE/SAE) network or any other core network nodes or routers that transfer data packets or messages between endpoints 101. Examples of these, and other elements, are discussed in more detail below with respect to FIG. 4.

Still referring to FIG. 1, many packets traverse links 104 and nodes 102, as data is exchanged between endpoints 101. These packets may represent many different sessions and protocols. For example, if endpoint 101 is used for a voice or video call, then it may exchange Voice over Internet Protocol (VoIP) or Session Initiation Protocol (SIP) data packets with a SIP/VoIP server (i.e., the other endpoint 101) using Real-Time Transport Protocol (RTP). If endpoint 101 is used to send or retrieve email, device 102 may exchange Internet Message Access Protocol (IMAP), Post Office Protocol 3 Protocol (POP3), or Simple Mail Transfer Protocol (SMTP) messages with an email server (i.e., the other endpoint 101). If endpoint 101 is used to download or stream video, device 101 may use Real Time Streaming Protocol (RTSP) to establish and control media sessions with a video server (i.e., the other endpoint 101). Alternatively, the user at endpoint 101 may access a number of websites using Hypertext Transfer Protocol (HTTP) to exchange data packets with a web server (i.e., the other endpoint 101). It will be understood that packets exchanged between devices 101 may conform to numerous other protocols now known or later developed.

Network monitoring system 103 may be used to monitor the performance of network 100. Particularly, monitoring system 103 captures packets that are transported across links or interfaces 104 between nodes 102, endpoints 101, and/or any other network links or connections (not shown). In some embodiments, packet capture devices may be non-intrusively coupled to network links 104 to capture substantially all of the packets transmitted across the links. Although only three links 104 are shown in FIG. 1, it will be understood that in an actual network there may be dozens or hundreds of physical, logical or virtual connections and links between network nodes. In some cases, network monitoring system 103 may be coupled to all or a high percentage of these links. In other embodiments, monitoring system 103 may be coupled only to a portion of network 100, such as only to links associated with a particular carrier or service provider. The packet capture devices may be part of network monitoring system 103, such as a line interface card, or may be separate components that are remotely coupled to network monitoring system 103 from different locations.

Monitoring system 103 may include one or more processors running one or more software applications that collect, correlate and/or analyze media and signaling data packets from network 100. Monitoring system 103 may incorporate protocol analyzer, session analyzer, and/or traffic analyzer functionality that provides OSI (Open Systems Interconnection) Layer 2 to Layer 7 troubleshooting by characterizing IP traffic by links, nodes, applications and servers on network 100. In some embodiments, these operations may be provided, for example, by the IRIS® toolset available from Tektronix, Inc., although other suitable tools may exist or be later developed. The packet capture devices coupling network monitoring system 103 to links 104 may be high-speed, high-density LOGE probes that are optimized to handle high bandwidth IP traffic, such as the GEOPROBE® G10, also available from Tektronix, Inc., although other suitable tools may exist or be later developed. A service provider or network operator may access data from monitoring system 103 via user interface station 105 having a display or graphical user interface 106, such as the IRISVIEW configurable software framework that provides a single, integrated platform for several applications, including feeds to customer experience management systems and operation support system (OSS) and business support system (BSS) applications, which is also available from Tektronix, Inc., although other suitable tools may exist or be later developed.

Monitoring system 103 may further comprise internal or external memory 107 for storing captured data packets, user session data, and configuration information. Monitoring system 103 may capture and correlate the packets associated specific data sessions on links 104. In some embodiments, related packets can be correlated and combined into a record for a particular flow, session or call on network 100. These data packets or messages may be captured in capture files. A call trace application may be used to categorize messages into calls and to create Call Detail Records (CDRs). These calls may belong to scenarios that are based on or defined by the underlying network. In an illustrative, non-limiting example, related packets can be correlated using a 5-tuple association mechanism. Such a 5-tuple association process may use an IP correlation key that includes 5 parts: server IP address, client IP address, source port, destination port, and Layer 4 Protocol (Transmission Control Protocol (TCP), User Datagram Protocol (UDP) or Stream Control Transmission Protocol (SCTP)).

Accordingly, network monitoring system 103 may be configured to sample (e.g., unobtrusively) related data packets for a communication session in order to track the same set of user experience information for each session and each client without regard to the protocol (e.g., HTTP, RTMP, RTP, etc.) used to support the session. For example, monitoring system 103 may be capable of identifying certain information about each user's experience, as described in more detail below. A service provider may use this information, for instance, to adjust network services available to endpoints 101 such as the bandwidth assigned to each user, and the routing of data packets through network 100.

As the capability of network 100 increases toward LOGE and beyond (e.g., 100GE), each link 104 may support more users' flows and sessions. Thus, in some embodiments, link 104 may be a LOGE or a collection of LOGE links (e.g., one or more 100GE links) supporting thousands or tens of thousands of users or subscribers. Many of the subscribers may have multiple active sessions, which may result in an astronomical number of active flows on link 104 at any time where each flow includes many packets.

Figure 2:
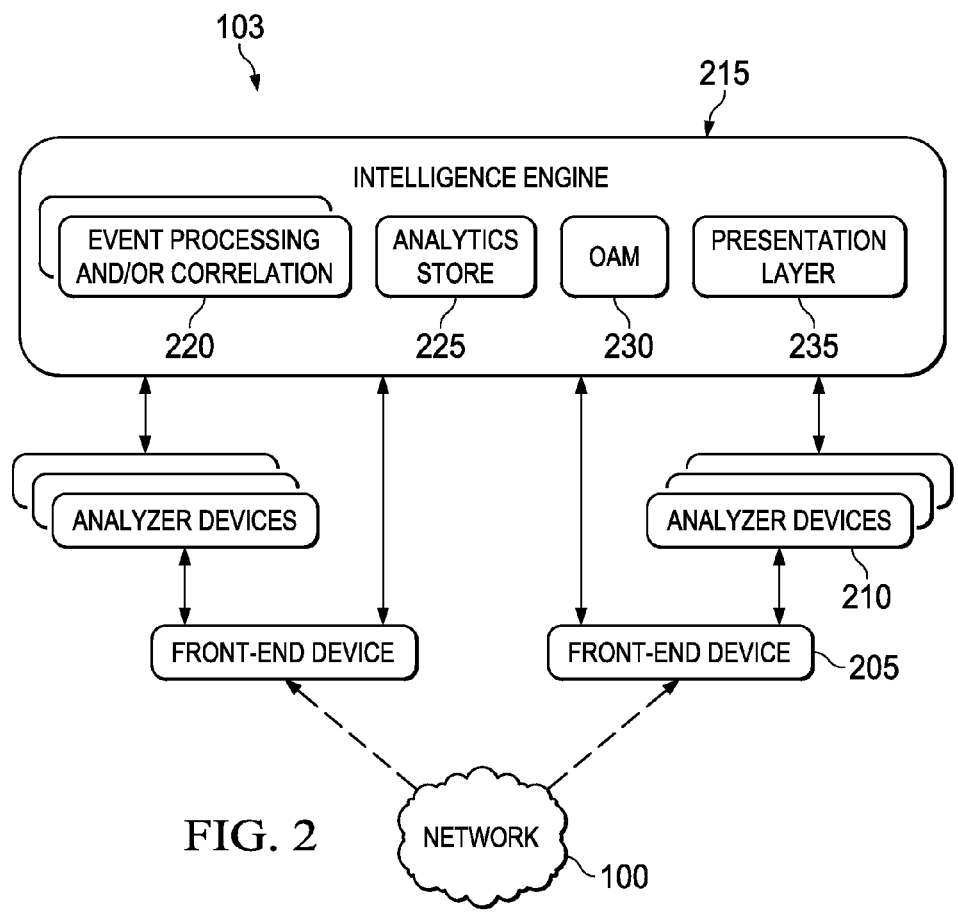
FIG. 2 is a block diagram of a hierarchical network monitoring system according to some embodiments.

Turning to FIG. 2, an example of network monitoring system 103 is illustrated according to some embodiments. As shown, one or more front-end monitoring devices or probes 205 (i.e., a first tier of a three-tiered architecture) may be coupled to network 100. Each of front-end devices 205 may also be coupled to one or more network analyzer devices 210 (i.e., a second tier), which in turn may be coupled to intelligence engine 215 (i.e., a third tier). Front-end devices 205 may also be directly coupled to intelligence engine 215, as described in more detail below. Typically, front-end devices 205 may be capable or configured to process data at rates that are higher (e.g., about 10 or 100 times) than analyzers 210. Although the system of FIG. 2 is shown as a three-tier architecture, it should be understood by a person of ordinary skill in the art in light of this disclosure that the principles and techniques discussed herein may be extended to a smaller or larger number of tiers (e.g., a single-tiered architecture, a four-tiered architecture, etc.).

Generally speaking, front-end devices 205 may passively tap into network 100 and monitor all or substantially of its data. For example, such one or more of front-end devices 205 may be coupled to one or more links 104 of network 100 shown in FIG. 1. Meanwhile, analyzer devices 210 may receive and analyze a subset of the traffic that is of interest, as defined by one or more rules. Intelligence engine 215 may include a plurality of distributed components configured to perform further analysis and presentation of data to users. For example, intelligence engine may include Event Processing and/or Correlation (EPC) 220; analytics store 225; Operation, Administration, and Maintenance (OAM) module 230; and presentation layer 235.

In some embodiments, front-end devices 205 may be configured to monitor all of the network traffic that it is tapped into (e.g., 10GE, 100GE, etc.). Front-end devices 205 may also be configured to intelligently distribute traffic based on a user session level. Additionally or alternatively, front-end devices 205 may distribute traffic based on a transport layer level. In some cases, each device 205 may analyze traffic intelligently to distinguish high-value traffic from low-value traffic based on a set of heuristics. Examples of such heuristics may include, but are not limited to, IMEI (International Mobile Equipment Identifier) TAC code (Type Allocation Code) and SVN (Software Version Number) as well as UAProf (User Agent Profile) and UA (User Agent), a customer list (e.g., mobile subscriber identifiers (IMSI), phone numbers, etc.), traffic content, or any combination thereof. Therefore, in some implementations, front-end devices 205 may feed higher-valued traffic to a more sophisticated one of analyzers 210 and lower-valued traffic to a less sophisticated one of analyzers 210 (to provide at least some rudimentary information).

Front-end devices 205 may also be configured to aggregate data to enable backhauling, to generate netflows and basic KPI calculations, time stamping of data, port stamping of data, filtering out unwanted data, protocol classification, and deep packet inspection (DPI) analysis. In addition, front-end devices 205 may be configured to distribute data to the back-end monitoring tools (e.g., analyzers 210 and/or intelligence engine 215) in a variety of ways, which may include flow based or user session based balancing. Devices 205 may also receive dynamic load information (e.g., namely CPU and memory utilization) from each of analyzer devices 210 so to enable intelligent distribution of data.

Analyzer devices 210 may be configured to passively monitor a subset of the traffic that has been forwarded to it by the front-end device(s) 205. Analyzer devices 210 may also be configured to perform stateful analysis of data, extraction of key parameters for call correlation and generation of call data records (CDRs), application specific processing, computation of application specific KPIs, and communication with intelligence engine 215 for retrieval of KPIs (e.g., in real-time and/or historical mode). In addition, analyzer devices 210 may be configured to notify front-end device(s) 205 regarding its CPU and/or memory utilization so that front-end device(s) 205 can utilize this information to intelligently distribute traffic.

Intelligence engine 215 may follow a distributed and scalable architecture. In some embodiments, EPC module 220 may receive events and may correlate information from front-end and analyzer devices 205 and 210, respectively. OAM module 230 may be used to configure and/or control front-end device 205 and analyzer devices 210, distribute software or firmware upgrades, etc. Presentation layer 235 may be configured to present event and other relevant information to the end-users. Analytics store 225 may include a storage or database for the storage of analytics data or the like.

In some implementations, analyzer devices 210 and/or intelligence engine 215 may be hosted at an offsite location (i.e., at a different physical location remote from front-end devices 205). Additionally or alternatively, analyzer devices 210 and/or intelligence engine 215 may be hosted in a cloud environment.

Figure 3:
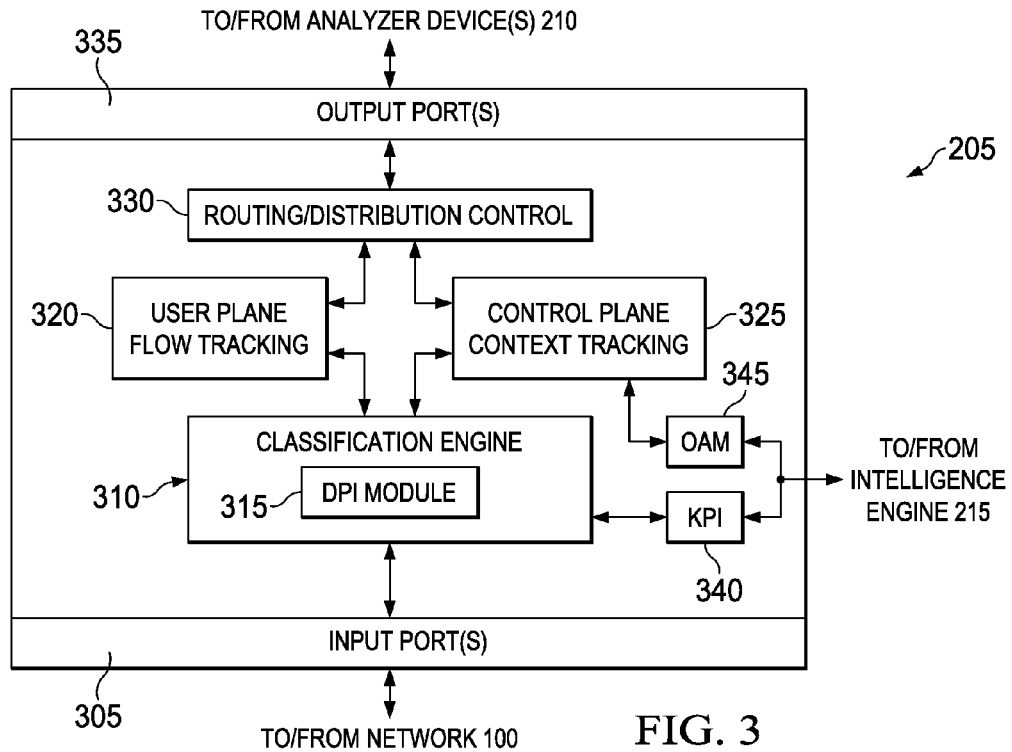
FIG. 3 is a block diagram of a monitoring probe according to some embodiments.

FIG. 3 is a block diagram of an example of front-end monitoring probe 205 according to some embodiments. Input port(s) 305 (e.g., 8, 40, or 100 Gb/s) may be coupled to network 100 and to classification engine 310, which may include DPI module 315. Classification engine 310 may be coupled to user plane (UP) flow tracking module 320 and to control plane (CP) context tracking module 325, which may be coupled to routing/distribution control engine 330. Routing engine 330 may be coupled to output port(s), which in turn may be coupled to one or more analyzer devices 210. In some embodiments, KPI module 340 and OAM module 345 may also be coupled to classification engine 310 and/or tracking modules 320/325, as well as to intelligence engine 215.

In some implementations, front-end probe or device 205 may be configured to receive traffic from network 100, for example, at a given data rate (e.g., 10 Gb/s, 100 Gb/s, etc.), and to transmit selected portions of that traffic to one or more analyzers 210, for example, at a different data rate. Classification engine 310 may identify user sessions, types of content, transport protocols, etc. (e.g., using DPI module 315) and transfer UP packets to flow tracking module 320 and CP packets to context tracking module 325. In some cases, classification engine 310 may implement one or more rules to allow it to distinguish high-value traffic from low-value traffic and to label processed packets accordingly. Routing/distribution control engine 330 may implement one or more load balancing or distribution operations, for example, to transfer high-value traffic to a first analyzer and low-value traffic to a second analyzer. Moreover, KPI module 340 may perform basic KPI operations to obtain metrics such as, for example, bandwidth statistics (e.g., per port), physical frame/packet errors, protocol distribution, etc.

OAM module 345 of front-end device 205 may be coupled to OAM module 230 of intelligence engine 215 and may receive control and administration commands, such as, for example, rules that allow classification engine 310 to identify particular types of traffic. For example, based on these rules, classification engine 310 may be configured to identify and/or parse traffic by user session (e.g., IMEI, IP address, phone number, etc.). In some cases, classification engine 310 may be session context aware (e.g., web browsing, protocol specific, etc.). Further, front-end device 205 may be SCTP connection aware to ensure, for example, that all packets from a same connection are routed to the same one of analyzers 210.

In various embodiments, blocks 305-345 may represent sets of software routines, logic functions, and/or data structures that are configured to perform specified operations. Although certain operations may be shown as distinct logical blocks, in some embodiments at least some of these operations may be combined into fewer blocks. Conversely, any given one of the blocks shown herein may be implemented such that its operations may be divided among two or more logical blocks. Moreover, although shown with a particular configuration, in other embodiments these various modules may be rearranged in other suitable ways.

Figure 4:
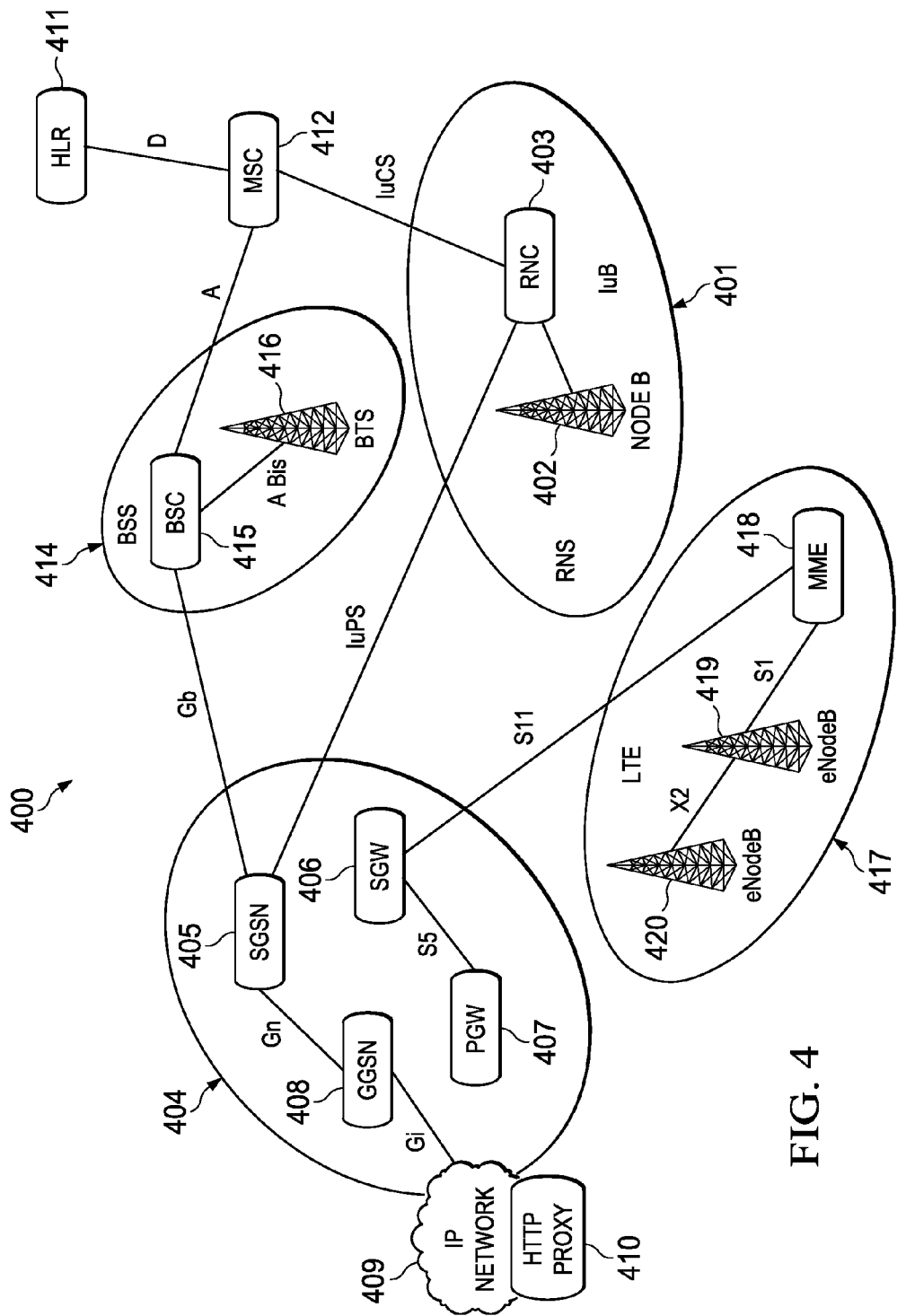
FIG. 4 is a block diagram of a 3rd Generation Partnership Project (3GPP) Mobile Radio Network including Global System for Mobile Communications (GSM), Universal Mobile Telecommunications System (UMTS), and Long Term Evolution (LTE) technologies where a monitoring probe may be deployed according to some embodiments.

FIG. 4 is a block diagram of a 3GPP Mobile Radio Network 400 including GSM, UMTS, and LTE technologies where a monitoring probe (e.g., front-end monitoring probe 205 in FIG. 2) may be deployed, according to some embodiments. As illustrated, core portion 404 may include SGSN 405 coupled to GGSN 408 via a Gn interface, and Serving Gateway (SGW) 406 coupled to Packet Data Network (PDN) Gateway (PDW) 407 via an S5 interface. Also, one or more elements within core network portion 404 may be coupled to IP network 409 and/or HTTP Proxy 410, for example, via a Gi interface. Meanwhile, LTE/SAE access portion 417 may include one or more Evolved Node Bs (eNodeBs) 419 and 420 coupled to each other via an X2 interface, as well as Mobility Management Entity (MME) 418 coupled to eNodeBs 419 and/or 420 via an S1 interface. A GSM access portion may include Radio Network Subsystem (RNS) 401 having NodeB 402 coupled to Radio Network Controller (RNC) 403 via an Iub interface, which in turn is coupled to SGSN 405 via an Iu-PS interface. Base Station Subsystem (BSS) 414 may include Base Station Transceiver (BTS) 416 coupled to Base Station Controller (BSC) via an Abis interface, and BSC 415 may be coupled to SGSN 405 via a Gh interface. BSC 415 may be coupled to Mobile Switching Center (MSC) 412 via an A interface, and RNC 403 may be coupled to MSC 412 via an Iu-CS interface. Finally, MSC 412 may be coupled to Home Location Register (HLR) 411 via a D interface.

Still referring to FIG. 4, network 400 serves to illustrate various illustrative ways in which monitoring system 103 of FIG. 1 may be coupled to a telecommunications network in order to provide various systems and methods for identifying communication devices in telecommunication networks as described herein. For example, in some cases, monitoring system 103 may be coupled to the A and/or Iu-CS interfaces to obtain voice call and Short Messaging System (SMS) information. In general, International Mobile Equipment Identity (IMEI) is provided periodically over these interfaces as part of the Subscriber's Identity Request message, and the IMEI Software Version (IMEI/SV) is provided along with each call and SMS transaction. In other cases, monitoring system 103 may be coupled to Gb and Iu-PS interfaces to obtain Data Attach and Session Management transaction information. Typically, the IMEI is provided as part of the GPRS Attach message, and the IMEI/SV is available along with each Packet Data Protocol (PDP) Session transaction. In yet other cases, monitoring system 103 may be coupled to the D interface to obtain IMEI and/or IMEI/SV provided as part of Mobile Application Part (MAP)/D transactions.

Additionally or alternatively, monitoring system 103 may be coupled to the Gn and/or Gi interfaces. Most HTTP-based transactions provide the User Agent field as one of the HTTP header fields. Since HTTP is both used directly (for web browsing) or indirectly as a transport for other protocols (e.g., MMS, Web Services, etc.) this is a common occurrence. Thus, Gn/Gi user-plane probing is able to detect these UserAgent values, which in some cases may be as specified by the Internet Engineering Task Force (IETF)'s Request for Comments (RFC) 2616 (Section 14.43). Also, many mobile HTTP requests provide UserAgent Profile (UAProf) information in the form or a URI to a Resource Description Framework (RDF) file of handset information defined in the "x-wap-profile" header. The UAProf may be defined, for example, as part of the World Wide Web Consortium (W3C) Composite Capability/Preference Profiles (CC/PP): Structure and Vocabularies 1.0 recommendation. Moreover, monitoring system 103 may be coupled to HTTP Proxy 410. In many cases, network operators proxy HTTP and Wireless Application Protocol (WAP) requests, and thus allow the capture of user-plane information including UserAgent and UAProf information.

Although FIG. 4 shows a 3GPP Mobile Radio Network 400 including GSM, UMTS, and LTE technologies, it should be noted that network 400 is provided as an example only. As a person of ordinary skill in the art will readily recognize in light of this disclosure, maybe of the techniques described herein may be equally applicable to other types of networks including other types of technologies (e.g., CDMA, CDMA 2G, EVDO 3G etc.). For example, in the context of CDMA technologies, voice call information may be intercepted (e.g., passively probed) between MSC and BSC nodes on an A1 interface. Roaming information may be intercepted between MSC and HLR on a C interface, between HLR and Visitor Location Register (VLR) on a D interface. Also, short message (SMS) information may be intercepted between MSC and Short Message Service Center (SMSC) on a Q interface. In the case of 2G Data (e.g., CDMAone), information may be intercepted between BSC and MSC on an A3/A5 interfaces. In the case of 2.5G/3G Data (e.g., CDMA2000 either 1xRTT or EVDO), information may be intercepted between BSC and IP Switch on an A10/A11 interfaces. Furthermore, authentication information may be intercepted between an Authentication, Authorization and Accounting (AAA) server and an IP router as Remote Authentication Dial In User Service (RADIUS) over User Datagram Protocol (UDP).

Generally speaking, in order to identify a communication device or User Equipment (UE), monitoring system 103 may be configured to automatically determine device model and/or manufacturer using two or more pieces of correlated information. Monitoring system 103 may also be configured to automatically determine device's software versions using the same types of correlated information. Using this newly obtained information, monitoring system 103 may then be able to provide new services such as, for example, quantifying the performance of new or unknown communication devices, determining the impact of different software versions for the same device on service experience, etc.

In some implementations, the information to be correlated may come from a variety of different sources such as, for example: (i) The IMEI, IMEI/SV or CDMA MEID values from various call, messaging or data transaction records; (ii) the date that the communication device is first noticed (as a default case, an unknown or partially identified device may be presented or evaluated with a range of dates—e.g., "unknown 2012-04-01" or "unknown Android® 2012-04-01"); (iii) the identity of subscribers that present first with a given device ("local" or "roamers"); (iv) the volume of traffic or service accesses from various call, messaging or data transaction records; (v) the UserAgent that users of the device use when accessing HTTP Uniform Resource Identifiers (URIs); (vi) the UserAgent presented within user-plane traffic (e.g., Gn in GPRS or UMTS, or S5 in the case of LTE or via a HTTP proxy log); (vi) the UA Profile RDF that the device presents when accessing various data services (e.g., HTTP, WAP, MMS)—again the UA Profile URI is presented within user-plane traffic (e.g., Gn in GPRS or UMTS, or S5 in the case of LTE or via a HTTP proxy log); and/or (vii) the domain of the UA Profile RDF resource (e.g., an RDF coming from "http://wap.xyz.com/UAprof/K.xml" identifies the vendor as "XYZ").

By correlating these disparate pieces of information together from the various data sources that reference a specific communication device, an approximation of the device's identifier may be created which allows the device to be identified for presentation even in cases where it has not been provisioned (or even has been provisioned incorrectly) by the network operator. In addition to the device (e.g., IMEI Type Allocation Code (TAC), or IMEI-TAC) correlation, the device's Software Version (SVN) may also be correlated so that, where a specific device (IMEI-TAC) and Version (SVN) have been identified, this information may be propagated to a different version of the same device.

Accordingly, as a person of ordinary skill in the art will recognize in light of this disclosure, certain techniques described herein go beyond simply presenting devices using look-up table against the IMEI-TAC (or CDMA mobile equipment identifier (MEID) Regional Code and Manufacturer Code). Namely, these techniques also correlate IMEI-TAC and/or MEID value(s) against additional user-plane information (e.g., date, service volume, UserAgent, UA Profile, etc.) to determine the device model and manufacturer in cases where the device has not yet been provisioned, or where the provisioned value is incorrect. In addition, these techniques enable the treatment of device Version (IMEI SVN) as a hierarchy from a device, which allows propagation of device information for different versions of the same device. As such, these techniques may allow monitoring system 103 to make device and device version information available, and to present such information even in cases where a device has not yet been provided or provisioned by the network operator (e.g., when a handset is newly available on the network provisioning information is typically not yet available). Consequently, when performing one or more of the operations described above, intelligence engine 215 may be capable of aggregating information by device in an improved manner, and the impact of a specific software version may also be made available.

FIG. 5 is a flowchart of an example of a method of identifying communication devices in telecommunication networks. In some embodiments, method 500 may be performed, at least in part, by network monitoring system 103 shown in FIG. 1. As illustrated, at block 501, method 500 may include receiving an identification code originated from a communication device (e.g., a handset or some other UE) in association with a communication or message transmitted by the device. For example, monitoring system 103 may collect IMEI, IMEI-TAC, SV, IMEI/SV, MEID, etc. from A, IuCS, Gb, IuPS and/or MAP-D interfaces (e.g., IMEI-TAC Type Acceptance code or the IMEI/SV including the IMEI-TAC and Software Version (SVN)). At block 502, method 500 may include receiving user-plane information. For example, monitoring system 103 may collect UserAgent and/or UAProf information from Gn, Gi, and/or HTTP Proxy interfaces.

Then, at block 503, method 500 may correlate the identification code with the user-place information. For example, such a correlation may be performed based upon common subscriber identifier(s) (e.g., International Mobile Subscriber Identity or IMSI) and time (e.g., time of transmission and/or capture of a message or communication). Finally, at block 504, method 500 may include identifying the communication device based, at least in part, upon the correlation. For example, monitoring system 103 may yield the device's model, version, and/or manufacturer information.

In some embodiments, monitoring system 103 may create and maintain a hierarchical cache or database of device or handset information. In that regard, FIG. 6 is a block diagram of an example of a hierarchical device information data structure. In some embodiments, such a data structure may be mainlined for example, by monitoring system 103. As shown, data structure 600 may include two or more portions for each identified communication device. Root portion 601 may include the IMEI-TAC (e.g., an 8 digit integer), label (e.g., 255 character string), manufacturer (e.g., 255 character string), a "first seen" field (e.g., date), an indication of whether the subscriber is in his home area (e.g., Boolean), an indication of whether the subscriber is roaming (e.g., Boolean), an event count field showing a number of identified instances of the same device (e.g., integer), and a type of device (e.g., enumerated variable). For each root portion 601, one or more (n≥1) branch portion(s) 602 may be created for each identified version of the same IMEI-TAC code. In this example, branch portion 602 may include an SVN (e.g., 2 digit integer), a label (e.g., 255 character string), an Operating System (OS) supplier (e.g., 255 character string), an OS family (e.g., an enumerated variable), a User Agent (e.g., a 4096 character string), a UAProf URI (e.g., a 4096 character string), an event count showing a number of devices with the respective SVN, and a "first seen" field (e.g., date).

It should be noted, with respect to FIG. 6, that the various fields or variables shown are presented for sake of illustration only, but numerous variations are possible in light of this disclosure. Generally speaking, hierarchical database may be created such that it includes a plurality of root portions 601, one for each distinct communication device, and each of root portions may include one or more branch portions 602, one for each different version of its corresponding communication device.

Figure 7:
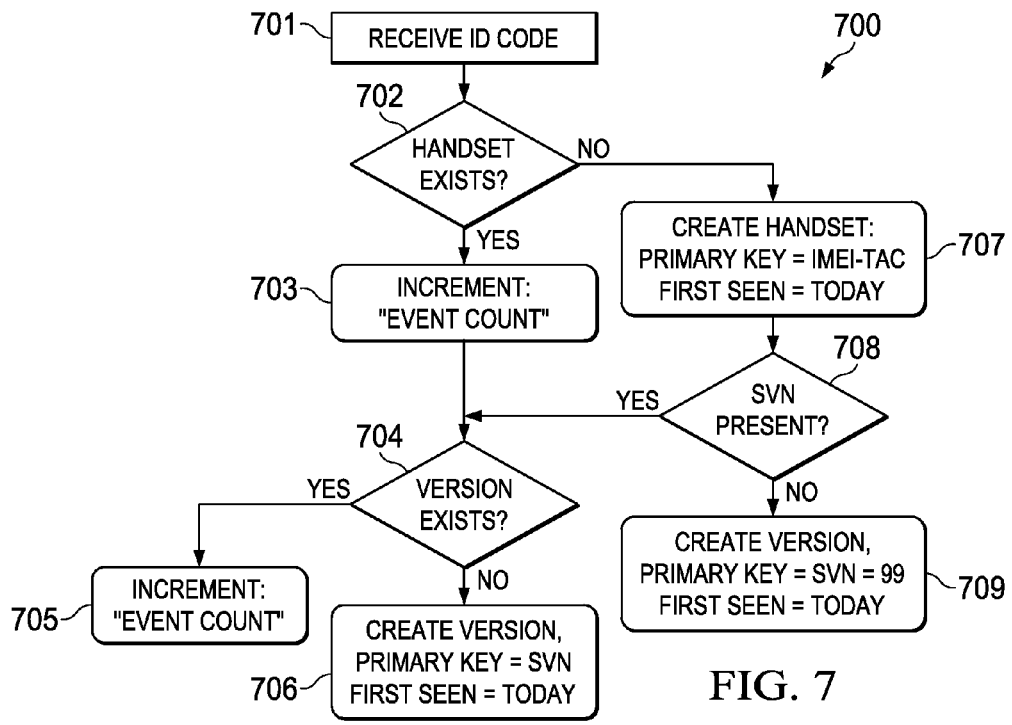
FIG. 7 is a flowchart of a method of updating a device database according to some embodiments.

FIG. 7 is a flowchart of an example of a method of updating a device database. In some embodiments, method 700 may be performed, at least in part, by network monitoring system 103 shown in FIG. 1 to create and/or update one or more records such as shown in FIG. 6. At block 701, method 700 may include receiving an identification code (e.g., IMEI-TAC or MEID). Such an identification code may be received, for example, from A, IuCS, Gb, IuPS and/or MAP-D interfaces. At block 702, method 700 may determine whether the communication device (e.g., a handset or the like) already exists in the device database, for example, by comparing the received ID Code with a corresponding field in one or more of a plurality of root portions 601 of the device database structure. If the device exists—i.e., it has been previously identified and a respective root portion 601 has already been created for that device—then, at block 703, method 700 may include incrementing the "event count" field for that root entry. At block 704, method 700 may include determining whether the version of the received ID code already exists—i.e., it has also been previously identified and a corresponding branch portion 602 has already been created for that version. If so, then the "event count" for the branch entry may be incremented at block 705. Otherwise, at block 706, method 700 may create a new version of the device in the database (i.e., it may create a new branch portion n for the same root portion 601), for instance, using the SVN as the primary key and setting the "first seen" field for that entry as the present day or time (e.g., "today").

Returning to block 702, if method 700 determines that the communication device does not yet exist in the database, then it may create a root entry 601 for that device, for example, using the IMEI-TAC as the primary key and setting the "first seen" field for that entry as "today" at block 707. At block 708, if SVN information is present in the received ID code, the control passes to block 704 and method 700 proceeds as described above. Otherwise, at block 709, method 700 may create a "catch all" branch entry for that version using an SVN equal to 99 (or some other arbitrary value) as the primary key, and also setting the "first seen" field for that entry as "today."

Figure 8A:
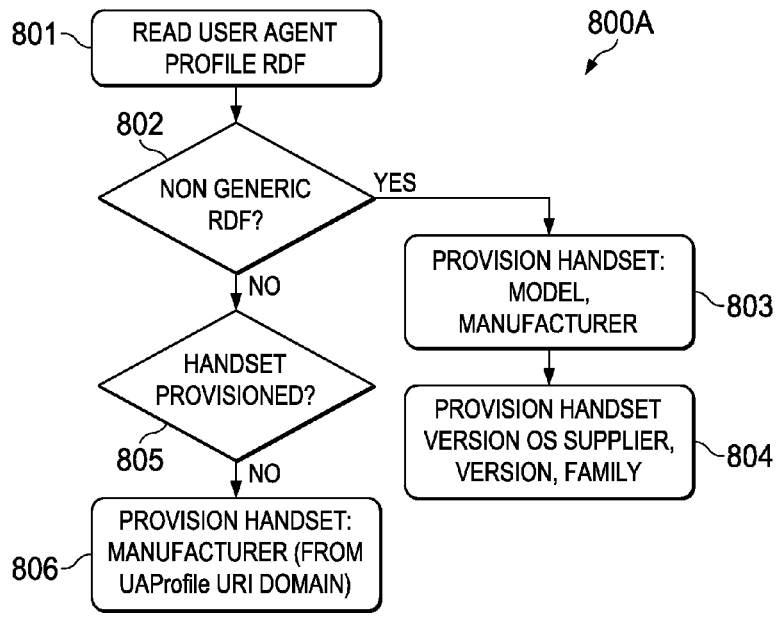
FIG. 8A is a flowchart of a method of using a first type of correlated user-plane information according to some embodiments.
Figure 8B:
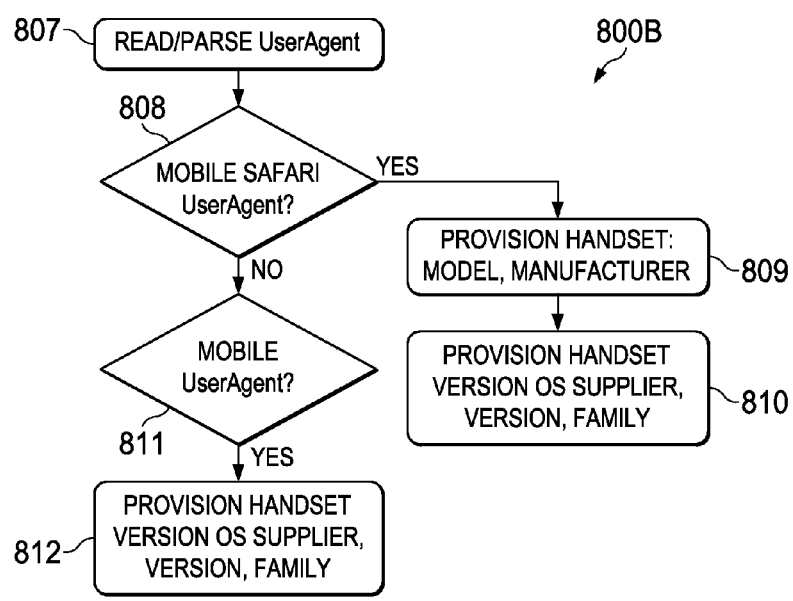
FIG. 8B is a flowchart of a method of using a second type of correlated user-plane information according to some embodiments.

As noted above, to obtain model, version, and/or manufacturer information for one or more database elements shown in FIG. 6, monitoring system 103 may attempt to correlate user-plane information with the identification code(s) captured, for example, using the method of FIG. 7. To illustrate these techniques, FIG. 8A shows a flowchart of an example of a method of using correlated UA Profile information, and FIG. 8B shows a flowchart of an example of a method of using correlated UserAgent information. Again, in some embodiments, methods 800A and/or 800B may be performed, at least in part, by network monitoring system 103 shown in FIG. 1. Also, in various implementations, these different types of user-plane information may be received, for example, from Gn, Gi, and/or HTTP Proxy interfaces.

Referring to method 800A, block 801 may include receiving and/or reading UA Profile Resource Description Framework (RDF) information correlated with a previously determined identification code. At block 802, method 800A may decide whether the RDF information is non-generic. If so, at block 803 method 800A may include retrieving the device's model and/or manufacturer from a stored and/or available source or specification (e.g., a W3C specification or the like). An example of a UA Profile RDF is:

Root (rdf:RDF)→Tag <rdf:Description> [rdf: ID="Profile"]→Tag <prf:component>→<rdf:Description [rdf:ID="HardwarePlatform"]→Read Tags vendor=<prf: Vendor>, Model=<prf:Model>.

Then, at block 804, method 800A may include retrieving the device's version, OS supplier, and/or other information (e.g., product family, etc.). For instance, if the UA Profile RDF defines the OS vendor and version, then the SVN entry for this device may include the OS supplier, version, and family completed:

Root (rdf:RDF)→Tag <rdf:Description> [rdf: ID="Profile"]→Tag <prf:component>→Tag <rdf:Description> [rdf:ID="SoftwarePlatform"]→ Read Tags Family=<prf:OSName>, Supplier=<prf:OSVendor>, Version=<prf:OSVersion>.

Returning to block 802, if the RDF information is determined to be generic (e.g., if the RDF refers to either a set of devices rather than a specific device which occurs where manufactures use the same software component like MMS editor or HTTP browser with several different devices), and if the device has not yet been provisioned at block 805 (e.g., which may be identified by examining the device cache or database), then method 800A may provision the device's manufacture based, at least in part, upon the UA Profile URI domain or other URI information. For example, the URI information may include: "http://www.xyz.com.tw/OS/ Common/handset/ua-profile.xml;" thus indicating that the manufacturer in this case is "XYZ" and the device model is "handset" and the OS is "OS." In some implementations, the "domain" part of the URI may be used with certain suffixes and/or prefixes removed (e.g., "www.", "wap.", "m," "mms", "mobile," etc.).

Referring to method 800B, block 807 may include receiving, reading, and/or parsing a UserAgent correlated with a previously determined identification code. At block 808, method 800B may determine whether the UserAgent belongs to a type of browser that provides additional information (e.g., Apple's Safari®). If so, then at blocks 809 and 810 method 800B may provision the model and/or manufacturer as well as the device version, OS Supplier, Version, and family information based upon the UserAgent. Otherwise, at block 811 method 800B may determine whether the UserAgent belongs to another mobile browser (e.g., Android Browser®, Chrome®, Symbian Web Browser®, Opera®, Mobile Opera®, Firefox®, Windows Mobile IE®, Palm WebOS Browser®, RIM Blackberry Browser®, Samsung Bada Browser®, MeeGo Chrome®, Chromium®, etc.). If so, then at block 812 method 800B may determine the device version, OS Supplier, Version, and family information based upon the UserAgent. An example of the latter may be as follows:

Mozilla/5.0 (iPhone; U; CPU iPhone OS 5_0_1 like Mac OS X; de_DE) AppleWebKit (KHTML, like Gecko) Mobile [FBAN/FBForIPhone;FBAV/4.0.3;FBBV/4030.0; FBDV/ iPhone4,1;FBMD/iPhone;FBSN/iPhone OS;FBSV/5.0.1; FBSS/2; FBCR/Swisscom;FBID/phone;FBLC/de_DE; FBSF/2.0].

Thus, in some cases, from a single mobile browsing session, monitoring system 103 may be able to correctly identify the device's manufacturer, model, OS family, name and version, as well as the basic device type (e.g., phone, tablet, etc.).

In addition to the foregoing, network monitoring system 103 may be configured to create a label for use with unknown communication devices as follows. If the UAProf RDF file provides the model and manufacturer then such a label may use "<Manufacturer> <Model> (<OS>)" such as, for example: Samsung® GT-I9000 (Android®), HTC Corporation® HTC Desire S® (Android®), or Nokia N800® (Symbian®) (without the ® symbols). Conversely, if the UAProf is for a generic device (common in the Microsoft Windows Phone® and Google Android® case) then the URI's domain name may be used to identify the manufacturer, for instance, with an appended date "Unknown <Manufacturer> <Date> (<OS>)" such as, for example: "UNKNOWN Samsung® 4-4-12 (Android®)", UNKNOWN 23-03-12 (Android®), or UNKNOWN 25-03-12 (Windows Phone®) (without the ® symbols). Otherwise the model and manufacturer may be taken from the UserAgent (e.g., "Apple® iPhone4,1 (iOS 5®)" again, without the ® symbols).

In some cases, network monitoring system 103 may update less complete information within its device database with more complete information at a later point in time. In other words, initially coarse/unspecific information may be refined later when additional information—from either a different subscriber with the same handset or a never software version of the same handset—is available. For example, if initially a new handset has been identified as "UNKNOWN 23-03-12 (Android®)" because the user data session only accessed MMS and did not provide a specific UAProf RDF or known Mobile Browser UserAgent, then later if the same device type (could be different device and even different software version) provides a user data session with identifiable model and manufacturer, then the handset information may be updated. Thus, in some implementations, network monitoring system 103 may only need to receive a single user data session with useful UAProf or UserAgent values to correctly identify all instances and versions of a device type. More generally, this means that the matching tends to be successful very quickly. In the case of device version again the OS Family, provider and version may be taken from either the UAProf or User-Agent. It may also be assumed that the OS Family and provider will not change for a class of device, which means that, as long as a single device version has been identified, then network monitoring system 103 may populate the OS Family and provider for all other versions of the same device with that same information.

In some embodiments, the techniques described above may be similarly applied to other identification codes. For example, in the context of CDMA technologies (e.g., CDMA voice, 1xRTT, EV-DO, EVDV, etc.), MEIDs may be used as identification codes, the first n hexadecimal digits (e.g., n=8) may be treated as a TAC, and the SVN may be set to an arbitrary value (e.g., 99) representing an unknown version.

It should be understood that the various operations described herein, particularly in connection with FIGS. 5-8, may be implemented in software, hardware, or a combination thereof. The order in which each operation of a given method is performed may be changed, and various elements of the systems illustrated herein may be added, reordered, combined, omitted, modified, etc. It is intended that the invention(s) described herein embrace all such modifications and changes and, accordingly, the above description should be regarded in an illustrative rather than a restrictive sense.

Figure 9:
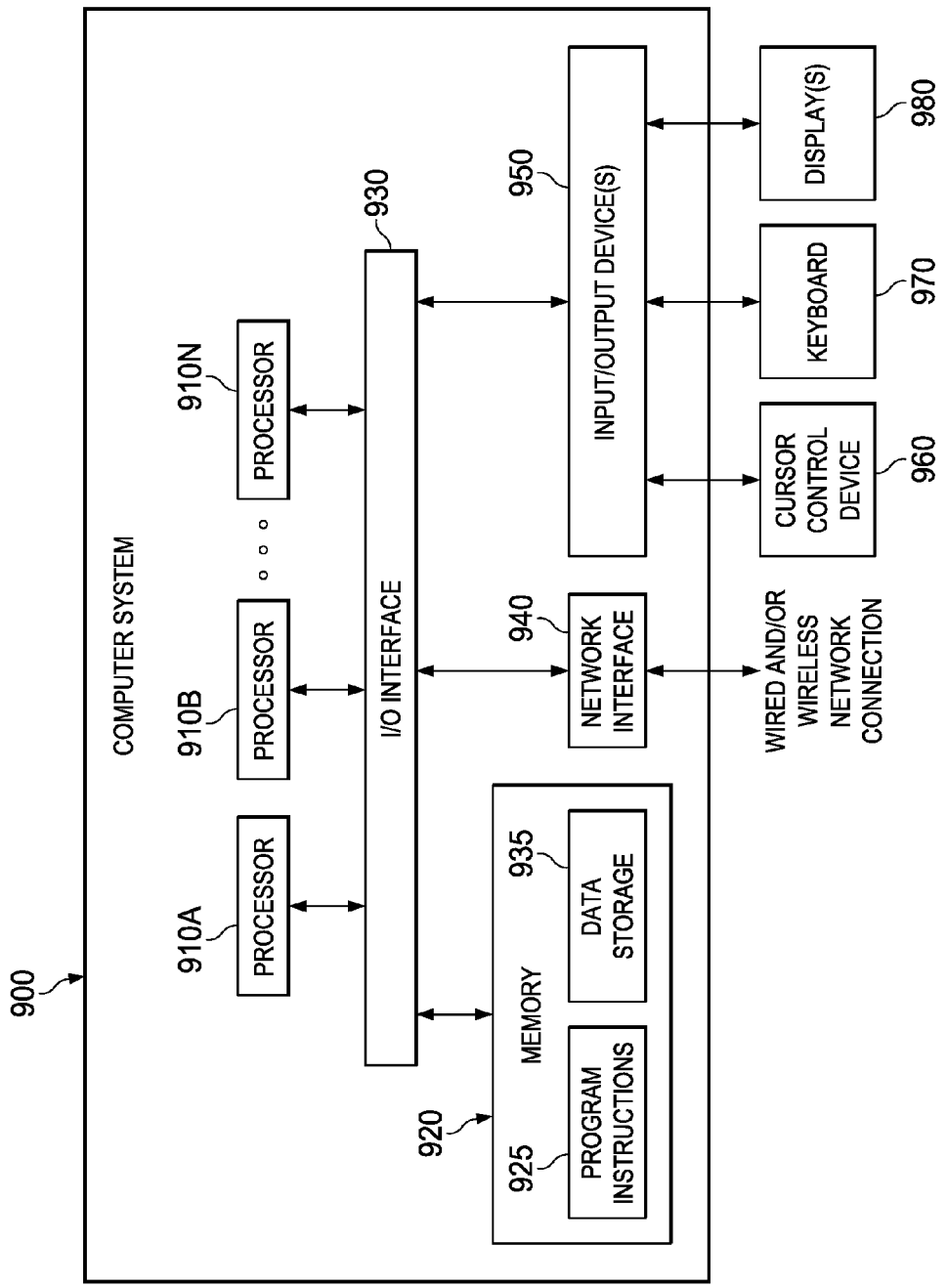
FIG. 9 is a block diagram of a computer system configured to implement various systems and methods described herein according to some embodiments.

Aspects of network monitoring system 100 may be implemented or executed by one or more computer systems. One such computer system is illustrated in FIG. 9. In various embodiments, computer system 900 may be a server, a mainframe computer system, a workstation, a network computer, a desktop computer, a laptop, or the like. For example, in some cases, front-end monitoring probe 205 shown in FIG. 2 may be implemented as computer system 900. Moreover, one or more of analyzer devices 210 and/or intelligence engine may include one or more computers in the form of computer system 900. As explained above, in different embodiments these various computer systems may be configured to communicate with each other in any suitable way, such as, for example, via network 100.

As illustrated, computer system 900 includes one or more processors 910A-N coupled to a system memory 920 via an input/output (I/O) interface 930. Computer system 900 further includes a network interface 940 coupled to I/O interface 930, and one or more input/output devices 950, such as cursor control device 960, keyboard 970, and display(s) 980. In some embodiments, a given entity (e.g., network monitoring system 110) may be implemented using a single instance of computer system 900, while in other embodiments multiple such systems, or multiple nodes making up computer system 900, may be configured to host different portions or instances of embodiments. For example, in an embodiment some elements may be implemented via one or more nodes of computer system 900 that are distinct from those nodes implementing other elements (e.g., a first computer system may implement classification engine 310 while another computer system may implement routing/distribution control module 330).

In various embodiments, computer system 900 may be a single-processor system including one processor 910A, or a multi-processor system including two or more processors 910A-N (e.g., two, four, eight, or another suitable number). Processor(s) 910A-N may be any processor capable of executing program instructions. For example, in various embodiments, processor(s) 910A-N may be general-purpose or embedded processors implementing any of a variety of instruction set architectures (ISAs), such as the x86, POW- ERPC®, ARM®, SPARC®, or MIPS® ISAs, or any other suitable ISA. In multi-processor systems, each of processor(s) 910A-N may commonly, but not necessarily, implement the same ISA. Also, in some embodiments, at least one processor(s) 910A-N may be a graphics processing unit (GPU) or other dedicated graphics-rendering device.

System memory 920 may be configured to store program instructions and/or data accessible by processor(s) 910A-N. In various embodiments, system memory 920 may be implemented using any suitable memory technology, such as static random access memory (SRAM), synchronous dynamic RAM (SDRAM), nonvolatile/Flash-type memory, or any other type of memory. As illustrated, program instructions and data implementing certain operations, such as, for example, those described herein, may be stored within system memory 920 as program instructions 925 and data storage 935, respectively. In other embodiments, program instructions and/or data may be received, sent or stored upon different types of computer-accessible media or on similar media separate from system memory 920 or computer system 900. Generally speaking, a computer-accessible medium may include any tangible, non-transitory storage media or memory media such as magnetic or optical media—e.g., disk or CD/DVD-ROM coupled to computer system 900 via I/O interface 930.

The terms "tangible" and "nontransitory," as used herein, are intended to describe a computer-readable storage medium (or "memory") excluding propagating electromagnetic signals, but are not intended to otherwise limit the type of physical computer-readable storage device that is encompassed by the phrase computer-readable medium or memory. For instance, the terms "non-transitory computer readable medium" or "tangible memory" are intended to encompass types of storage devices that do not necessarily store information permanently, including for example, random access memory (RAM). Program instructions and data stored on a tangible computer-accessible storage medium in non-transitory form may further be transmitted by transmission media or signals such as electrical, electromagnetic, or digital signals, which may be conveyed via a communication medium such as a network and/or a wireless link.

In an embodiment, I/O interface 930 may be configured to coordinate I/O traffic between processor 910, system memory 920, and any peripheral devices in the device, including network interface 940 or other peripheral interfaces, such as input/output devices 950. In some embodiments, I/O interface 930 may perform any necessary protocol, timing or other data transformations to convert data signals from one component (e.g., system memory 920) into a format suitable for use by another component (e.g., processor(s) 910A-N). In some embodiments, I/O interface 930 may include support for devices attached through various types of peripheral buses, such as a variant of the Peripheral Component Interconnect (PCI) bus standard or the Universal Serial Bus (USB) standard, for example. In some embodiments, the function of I/O interface 930 may be split into two or more separate components, such as a north bridge and a south bridge, for example. In addition, in some embodiments some or all of the functionality of I/O interface 930, such as an interface to system memory 920, may be incorporated directly into processor(s) 910A-N.

Network interface 940 may be configured to allow data to be exchanged between computer system 900 and other devices attached to network 115, such as other computer systems, or between nodes of computer system 900. In various embodiments, network interface 940 may support communication via wired or wireless general data networks, such as any suitable type of Ethernet network, for example; via telecommunications/telephony networks such as analog voice networks or digital fiber communications networks; via storage area networks such as Fiber Channel SANs, or via any other suitable type of network and/or protocol.

Input/output devices 950 may, in some embodiments, include one or more display terminals, keyboards, keypads, touch screens, scanning devices, voice or optical recognition devices, or any other devices suitable for entering or retrieving data by one or more computer system 900. Multiple input/output devices 950 may be present in computer system 900 or may be distributed on various nodes of computer system 900. In some embodiments, similar input/output devices may be separate from computer system 900 and may interact with one or more nodes of computer system 900 through a wired or wireless connection, such as over network interface 940.

As shown in FIG. 9, memory 920 may include program instructions 925, configured to implement certain embodiments described herein, and data storage 935, comprising various data accessible by program instructions 925. In an embodiment, program instructions 925 may include software elements of embodiments illustrated in FIG. 2. For example, program instructions 925 may be implemented in various embodiments using any desired programming language, scripting language, or combination of programming languages and/or scripting languages (e.g., C, C++, C#, JAVA®, JAVASCRIPT®, PERL®, etc.). Data storage 935 may include data that may be used in these embodiments. In other embodiments, other or different software elements and data may be included.

A person of ordinary skill in the art will appreciate that computer system 900 is merely illustrative and is not intended to limit the scope of the disclosure described herein. In particular, the computer system and devices may include any combination of hardware or software that can perform the indicated operations. In addition, the operations performed by the illustrated components may, in some embodiments, be performed by fewer components or distributed across additional components. Similarly, in other embodiments, the operations of some of the illustrated components may not be performed and/or other additional operations may be available. Accordingly, systems and methods described herein may be implemented or executed with other computer system configurations.

The various techniques described herein may be implemented in software, hardware, or a combination thereof. The order in which each operation of a given method is performed may be changed, and various elements of the systems illustrated herein may be added, reordered, combined, omitted, modified, etc. It will be understood that various operations discussed herein may be executed simultaneously and/or sequentially. It will be further understood that each operation may be performed in any order and may be performed once or repetitiously. Various modifications and changes may be made as would be clear to a person of ordinary skill in the art having the benefit of this specification. It is intended that the invention(s) described herein embrace all such modifications and changes and, accordingly, the above description should be regarded in an illustrative rather than a restrictive sense.

The invention claimed is:

1. A method for identifying client device information in a telecommunications network, comprising:
performing, by a telecommunications monitoring system:
receiving an identification code of a new device operating in a network controlled at least in part by a telecommunications operator, the device having at least one of: a model or a manufacturer, wherein the device has not been provisioned on the network;

obtaining user-plane information within one or more communications made by the new device;

correlating the identification code with the user-plane information based upon a subscriber identifier present in the identification code and the user-plane information and a time of capture of the user-plane information and identification code;

determining, based upon the correlation, a device model code and a device version code for the new device;

comparing the device model code and the device version code to a hierarchical device database to verify that the new device is not provisioned on the network;

creating a new device entry in the device database related to the new device that includes at least one of: the device model code, the device version code or the manufacturer of the device;

comparing additional device model codes and device version codes from additional client devices to the new device entry; and aggregating performance data related to the new device and the additional client devices that match at least one of the device model code and the device version code in the new device entry.

2. The method of claim 1, wherein the identification code is an International Mobile Equipment Identity-Type Allocation Code (IMEI-TAC) or a Mobile Equipment Identifier-Manufacturer Code (MEID-MC).

3. The method of claim 1, wherein prior to the determination, at least one of the model or the manufacturer has been incorrectly provided to the telecommunications monitoring system by the telecommunications operator.

4. The method of claim 1, wherein the user-plane information includes a User Agent (UA) Profile Resource Description Framework (RDF) value.

5. The method of claim 4, wherein the UA Profile RDF includes at least one of the model or the manufacturer of the device.

6. The method of claim 4, wherein the UA Profile RDF includes a Uniform Resource Identifier (URI), and wherein at least one of the model or the manufacturer is determined based upon the URI.

7. The method of claim 1, wherein the user-plane information includes a User Agent (UA) value of a web browser executed by the device.

8. The method of claim 7, wherein at least one of the model or the manufacturer is determined based upon the User Agent (UA) value of the web browser.

9. The method of claim 1, wherein the user-plane information includes a User Agent (UA) Profile Resource Description Framework (RDF) information, the method further comprising:

performing, by the telecommunications monitoring system:

storing data associated with the device, the data including an indication of: the model and the manufacturer, in response to the UA Profile RDF information including the model and manufacturer of the device; the manufacturer and a generic identification of the model, in response to the UA Profile RDF information including a domain name but not the model; or at least one of the model or the manufacturer obtained from the UA value of a web browser executed by the device, in response to the UA Profile RDF information not including: the domain name, the model, and the manufacturer.

10. A telecommunications monitoring system for identifying client device information in a telecommunications network, comprising:

a processor; and a memory coupled to the processor, the memory configured to store program instructions executable by the processor to cause the telecommunications monitoring system to:

receive an identification code of a new device operating in a network, the identification code obtained over a first network interface, the network controlled at least in part by a telecommunications operator, wherein the device has not been provisioned on the network;

receive user-plane information within a communication originated by the device over a second network interface, the second network interface different form the first network interface;

correlate the identification code with the user-plane information based upon a subscriber identifier present in the identification code and the user-plane information and a time of capture of the user-plane information and identification code;

determine, based upon a correlation between the identification code and the user-plane information, a device model code and a device version code for the new device;

comparing the device model code and the device version code to a hierarchical device database to verify that the new device is not provisioned on the network;

create a new device entry in the device database related to the new device that includes at least one of: the device model code, the device version code or the manufacturer of the device;

compare additional device model codes and device version codes from additional client devices to the new device entry; and aggregate performance data related to the new device and the additional client devices that match at least one of the device model code and the device version code in the new device entry.

11. The telecommunications monitoring system of claim 10, wherein at least one of the model or the manufacturer has been incorrectly provided to the telecommunications monitoring system by the telecommunications operator.

12. The telecommunications monitoring system of claim 11, wherein the first interface is an A interface, an IuCS interface, a Gb interface, an IuPS interface, or a MAP-D interface.

13. The telecommunications monitoring system of claim 12, wherein the identification code is an International Mobile Equipment Identity-Type Allocation Code (IMEI-TAC) or a Mobile Equipment Identifier-Manufacturer Code (MEID-MC).

14. The telecommunications monitoring system of claim 12, wherein the second interface is a Gn interface, a Gi interface, or a Proxy interface.

15. The telecommunications monitoring system of claim 12, wherein the user-plane information includes a User Agent (UA) Profile Resource Description Framework (RDF) value or an UA value of a web browser executed by the device.

* * * * *